United States Patent
Ji et al.

(10) Patent No.: US 11,478,976 B2
(45) Date of Patent: Oct. 25, 2022

(54) FLAT-PRESSING MANUFACTURING METHOD OF BIONIC ADHESIVE STRUCTURE BASED ON MICRO THROUGH-HOLE NICKEL-BASED MOLD

(71) Applicants: Nanjing Adhesion Technology Co., Ltd, Nanjing (CN); Nanjing Li-Hang Industry Institute of Bionic Technology Limited Company, Nanjing (CN)

(72) Inventors: Keju Ji, Nanjing (CN); Zhendong Dai, Nanjing (CN); Chunxia Zhao, Nanjing (CN); Yiqiang Tang, Nanjing (CN); Peiyun Gan, Nanjing (CN); Yuanhua Qiao, Nanjing (CN)

(73) Assignees: NANJING ADHESION TECHNOLOGY CO., LTD, Nanjing (CN); NANJING LI-HANG INDUSTRY INSTITUTE OF BIONIC TECHNOLOGY LIMITED COMPANY, Nanjing (CN)

( * ) Notice: Subject to any disclaimer, the term of this patent is extended or adjusted under 35 U.S.C. 154(b) by 0 days.

(21) Appl. No.: 17/237,079

(22) Filed: Apr. 22, 2021

(65) Prior Publication Data
US 2022/0048239 A1 Feb. 17, 2022

Related U.S. Application Data

(63) Continuation-in-part of application No. PCT/CN2020/111089, filed on Aug. 25, 2020.

(30) Foreign Application Priority Data

Aug. 12, 2020 (CN) .......................... 202010805845.3

(51) Int. Cl.
*B29C 51/10* (2006.01)
*B29C 51/38* (2006.01)
(Continued)

(52) U.S. Cl.
CPC .............. *B29C 51/10* (2013.01); *B29C 33/38* (2013.01); *B29C 51/36* (2013.01); *B29C 51/38* (2013.01); *B29K 2105/0097* (2013.01)

(58) Field of Classification Search
CPC ......... B29C 51/10; B29C 51/36; B29C 51/38; B29C 33/38; B29K 2105/0097
See application file for complete search history.

(56) References Cited

U.S. PATENT DOCUMENTS 11,254,566 B2 * 2/2022 Dai ..................... B81C 1/00206

* cited by examiner

*Primary Examiner* — Monica A Huson
(74) *Attorney, Agent, or Firm* — Bayramoglu Law Offices LLC

(57) ABSTRACT

A flat-pressing manufacturing method of a bionic adhesive structure based on a micro through-hole nickel-based mold is disclosed. The method includes the following steps: preparing a nickel-based mold with a micro through-hole array; placing the nickel-based mold on an elastic pad in a magnetic mold closing system; coating a liquid prepolymer uniformly on a backing, and placing a side of the backing coated with the liquid prepolymer on the nickel-based mold, covering a sealing diaphragm on the backing to separate a cavity into an upper chamber and a lower chamber, and performing a vacuum treatment on the lower chamber and an inflation treatment on the upper chamber to apply a uniform pressure on the backing layer and achieve a full filling of prepolymers with different viscosities; and after the filling is completed, curing and demolding to obtain the bionic adhesive structure.

10 Claims, 4 Drawing Sheets

(51) Int. Cl.
_B29C 51/36_ (2006.01)
_B29C 33/38_ (2006.01)
_B29K 105/00_ (2006.01)

FLAT-PRESSING MANUFACTURING METHOD OF BIONIC ADHESIVE STRUCTURE BASED ON MICRO THROUGH-HOLE NICKEL-BASED MOLD

CROSS REFERENCE TO THE RELATED APPLICATIONS

This application is a continuation application of the International Application PCT/CN2020/111089, filed on Aug. 25, 2020, which is based upon and claims priority to Chinese Patent Application No. 202010805845.3, filed on Aug. 12, 2020, the entire contents of which are incorporated herein by reference.

TECHNICAL FIELD

The present invention relates to the technical field of micro/nano manufacturing, and particularly to a flat-pressing manufacturing method of a bionic adhesive structure based on a micro through-hole nickel-based mold.

BACKGROUND

In nature, many organisms exhibit the ability of full-space adhesion in their living environment, such as from Boston Ivy in the plant kingdom to viruses in the non-cellular life forms, and from octopuses and mussels in the ocean to flies, spiders and geckos on the land. It can be intuitively found from the morphology of the terminal units of their adhesion system that "tip expansion" is the main structural feature of these biological functional units. Many organisms with full-space adhesion abilities exhibit excellent adhesion properties due to the structural characteristics of their adhesion functional units with expanded tips. The bionic adhesive structures with expanded tips show a broad application prospects in many fields, such as non-destructive handling, bionic wall climbing, and space operations.

In the past 20 years, scholars worldwide have conducted abundant research on the preparation of bionic adhesive microstructures, and there are many companies related to bionic adhesive materials in Germany and the United States, which has laid a good foundation for promoting the engineering application of biomimetic adhesion technology. However, the actual research found that due to the impact of cost, production capacity, product diversity and other factors, the actual situation is not satisfactory, and bionic adhesive materials are often not marketable. The lack of large-scale technology of bionic adhesive materials in China has contributed to the monopoly of European and American countries in this technical field. In 2012, Defense Advanced Research Projects Agency (DARPA) of the United States began to implement research on space application of bionic adhesion technology through the "Phoenix Program". Mastering the adhesion technology in space environment will greatly enhance manned spaceflight, on-orbit services, space security, and operational capabilities for non-cooperative targets, which shows the great national defense significance of the bionic adhesion technology.

Currently, the manufacturing methods of the tip-expanded bionic microstructures are mainly silicon-based lithography template molding or soft template molding. For example, in 2011, Professor Carlo Menon et al. of Simon Fraser University in Canada (US2011011732A1) used silicon-based lithography template to prepare tip-expanded bionic adhesive materials. In 2017, Professor Metin Sitti et al. of Carnegie Mellon University in the United States (US00973122B2) proposed that the preparation of the tip-expanded microstructure can be achieved by two-step dipping process based on silicon-based molding. The key element of the preparation of bionic adhesive material is the development of mold with excellent performance. Compared with the fragility of silicon-based molds and the easy deformability of polymer soft molds, metal molds have become the preferred solution of polymer molding technology due to their high mechanical strength, high thermal conductivity, good durability and other advantages. However, it is difficult to process and control the group of holes (hole density>10,000/cm$^2$) in the metal mold for the tip-expanded bionic microstructure, and the physical behavior of the interface during the molding process is complicated, which restricts the smooth promotion of the large-scale utilization of the metal mold.

In 2015, Gottlieb Binder GmbH, Germany, based on the technology of Professor Gorb's team from the Kiel University, proposed the roll-pressing manufacturing technology of the bionic adhesive structure with expanded tips (US20150010732A1), and put forward the application modes of through-hole flexible template in roll-pressing process. Compared with flat-pressing process, in the roll-pressing process, due to the role of the hoop force of the roller, it is easier to achieve the tip face sealing between the through-hole template and the surface of the roller. This patent provides design ideas for the flat-pressing process, but the roll-pressing process brings many difficulties to the injection molding and demolding of the mold structure with a large depth-to-diameter ratio, and restricts the formation of the microstructures with complex morphology.

In 2017, Professor Tian Yu's team of Tsinghua University (CN106378894A) proposed the processing method of wedge-shaped gecko-inspired surface mold on aluminum surface based on ultra-precision diamond cutting technology, showing the high cost-effective characteristics of preparing the bionic adhesive structure. However, due to the complexity of the interface physical behavior during the manufacturing of metal molds and the molding process, the smooth promotion of the large-scale manufacturing of the mushroom-shaped bionic adhesive structure with enlarged tips is restricted.

Therefore, it is necessary to carry out innovative work on the manufacturing technology of bionic adhesive structures with complex morphology based on metal molds, so as to provide technical support for the large-scale manufacturing of the bionic microstructure with enlarged tips.

SUMMARY

The objective of the present invention is to provide a flat-pressing manufacturing method of a bionic adhesive structure based on a micro through-hole nickel-based mold, so as to solve the problems existing in the prior art.

The present invention provides a flat-pressing manufacturing method of a bionic adhesive structure based on a micro through-hole nickel-based mold, including the following steps:

(1) preparing a nickel-based mold with a micro through-hole array;

(2) placing the nickel-based mold on an elastic pad in a magnetic mold closing system;

(3) coating a prepolymer uniformly on a backing, and placing a side of the backing coated with the prepolymer on the nickel-based mold, covering a sealing diaphragm on the backing to separate a cavity into an upper chamber and a lower chamber, and performing a vacuum treatment on the lower chamber and an inflation treatment on the upper chamber to apply a uniform pressure on the backing layer and achieve a full filling of cavities of through-holes by the prepolymer; and (4) after the filling is completed, curing and demolding to obtain the bionic adhesive structure.

Further, the through-holes of the nickel-based mold in step (1) are cylindrical holes or special-shaped holes, a maximum hole diameter is not greater than 100 µm, a thickness of the nickel-based mold is 20-500 µm, and a hole density is greater than 10,000/cm$^2$.

Further, the nickel-based mold has been subjected to an anti-adhesion treatment.

Further, the magnetic mold closing system in step (2) includes a magnet and the elastic pad.

Further, a surface roughness Ra of the magnet is less than or equal to 0.05 µm, and a surface finish of the magnet is greater than level 10; and an elastic modulus of the elastic pad is 1 MPa-10 MPa.

Further, the magnet is a permanent magnet or an electromagnet, and a substrate of the elastic pad is anti-adhesive or a surface of the substrate has been subjected to an anti-adhesion treatment.

Further, the liquid prepolymer in step (3) is a thermosetting prepolymer or an ultraviolet (UV)-curable prepolymer.

Further, a coating thickness of the prepolymer in step (3) is 400-600 µm, and a magnetically induced pressure of the magnetic mold closing system during the filling process is 0.1-0.5 MPa.

Further, the demolding in step (4) is to apply force from one side of the backing layer to tear off the backing layer uniformly and slowly.

Further, the bionic adhesive structure in step (4) is an elastomer microstructure array with a feature of tip expansion.

The present invention discloses the technical effects as follows.

In the present invention, a simple through-hole microporous structure is processed on a metal nickel plate by laser or photolithography assisted electroforming technology, and a metal nickel layer is deposited non-uniformly on the microporous cavity by electrochemical technology, thereby realizing the auxiliary modification of the morphology of the microporous cavity and the regulation of the side morphology of the tip-expanded microstructure.

In the present invention, for the modified micro through-hole metal mold, a layer of elastic pad is matched on the expanded tip surface of the micro-holes of the mold, and the pressure/pre-tightening force of the interface between the metal mold and the elastic pad is adjusted to realize the regulation of the morphology of the tip surface of the tip-expanded microstructure. By combining the electrochemical-assisted side morphology control technology, the omnidirectional design and control of the tip-expanded bionic microstructure can be realized.

Another technical highlight of the present invention is the imprinting technology suitable for micro through-hole metal molds. The existing micro/nano imprinting technology is mainly divided into flat-pressing technology and roll-pressing technology in form. In the imprint molding process, the physical processes such as the filling of prepolymer and the demolding after curing are quite different from the common non-expanded tip structure, especially the elimination of bubble defects in the filling process of the cavities of the through-holes by the prepolymer, and the strong deformation of the material caused by tip expansion during the process of curing and demolding, which may even lead to tearing defects, showing more complex contact mechanical behaviors. From this point of view, the flat-pressing process of nanoimprint technology is more suitable for molding the tip-expended microstructure because it can effectively achieve the uniform filling under negative pressure.

In the present invention, a layer of sealing diaphragm that can completely cover the lower chamber is placed on the backing, and the sealing diaphragm divides the cavity of the flat-pressing system into upper and lower parts; the gas is discharged from the lower chamber by a vacuum pump to form a vacuum environment in the lower chamber, and the upper chamber is filled with nitrogen by an air compressor; and the gas pressure is uniformly applied to the backing coated with prepolymer and the upper surface of the mold by the sealing diaphragm. The vacuum environment of the lower chamber and the uniform pressure of the gas on the upper surface can realize the uniform filling of prepolymer and the elimination of bubbles, so as to avoid the defects in the morphology of the adhesive materials.

The elastic pad of present application has an appropriate elastic modulus, which can achieve seamless contact with the mold after mold closing, and can further form a slightly convex arc in the through-hole array at the same time, so that the terminal ends of the obtained adhesive structure form structures with expanded-tips.

Through the implementation of the present invention, a novel perspective will be provided for the mold design of micro/nano imprinting technology, which helps to break through the technical bottleneck of the imprint manufacturing technology of this type of tip-expanded structure, and solve the technical problems of high-efficiency, high-precision and low-cost manufacturing of large-area micro/nano structure, and further helps to improve the universality of micro/nano imprinting manufacturing technology for microstructures.

BRIEF DESCRIPTION OF THE DRAWINGS

In order to illustrate the embodiments of the present invention or the technical solutions in the prior art more clearly, a brief introduction to the drawings required in the illustration of the embodiments is presented below. Apparently, the drawings in the following description are only some embodiments of the present invention. For those of ordinary skill in the art, other drawings may be derived according to these drawings without creative work.

DETAILED DESCRIPTION OF THE EMBODIMENTS

Various exemplary embodiments of the present invention are described below in detail in order to better support the feasibility of the present invention.

In the embodiments of the present invention, the heating curing method is that a heating curing module that can be started independently is installed at the bottom of the lower chamber. The heating curing module heats up and generates heat rapidly after starting, and the heat is radiated or conducted to the mold and the prepolymer, thereby curing the thermosetting prepolymer. The UV curing method is that a UV LED lamp that can be started independently is installed on the top of the upper chamber, and emit UV light downward after starting. Under the action of UV light, the UV-curable prepolymer undergoes a cross-linking and curing reaction. Meanwhile, a part of the UV light can pass through the transparent elastic pad to reach the surface of the magnet, and the surface roughness of the magnet reaches the mirror level, which can reflect the UV light and can assist the curing of the prepolymer in the micro-hole array of the mold. Especially for the tip-expanded structure, the UV light emitted by the light source cannot directly reach the covered area at the bottom, and the UV light reflected by the upper surface of the magnet can supplement the curing of the bottom area.

In the present invention, the backing layer, the filling prepolymer and the cured polymer have good adhesive strength. When demolding, the backing layer can be uniformly and slowly torn off by applying force from one side of the backing layer. The force can be applied manually, mechanically or by air pressure.

Embodiment 1

(1) Preparation of Nickel-Based Mold with Micro Through-Hole Array

Figure 1:
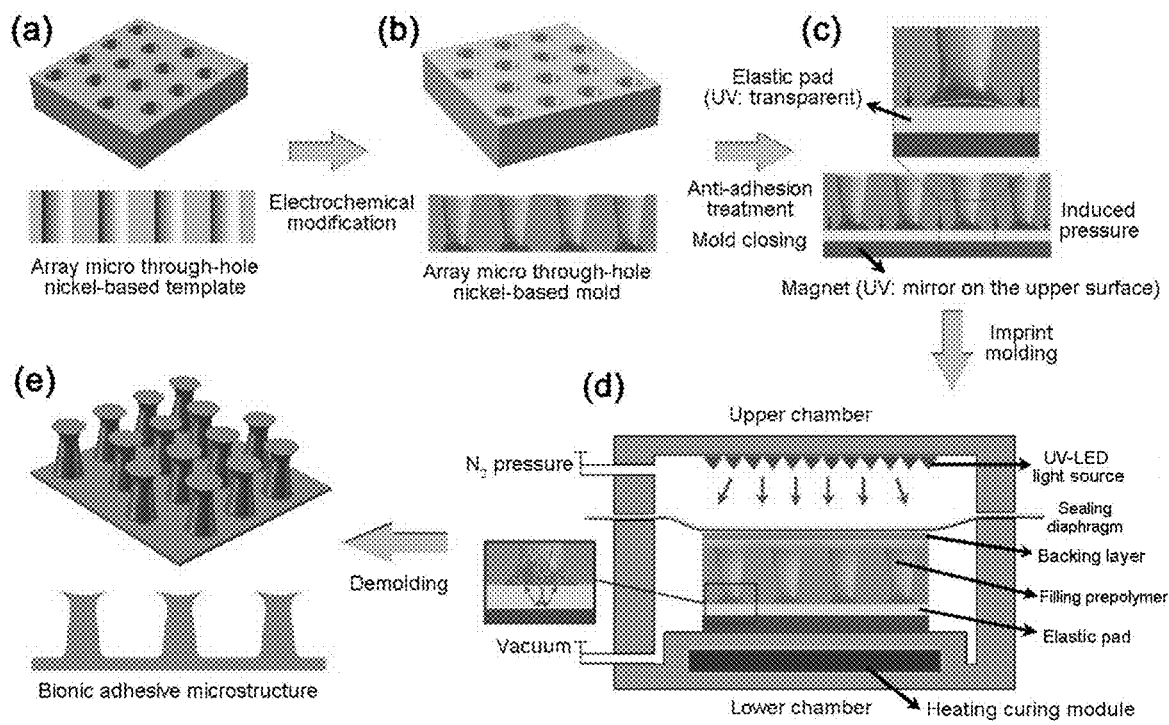
FIG. 1 is a flow diagram showing a flat-pressing manufacturing method of a bionic adhesive structure based on a micro through-hole nickel-based mold.
Figure 2A:
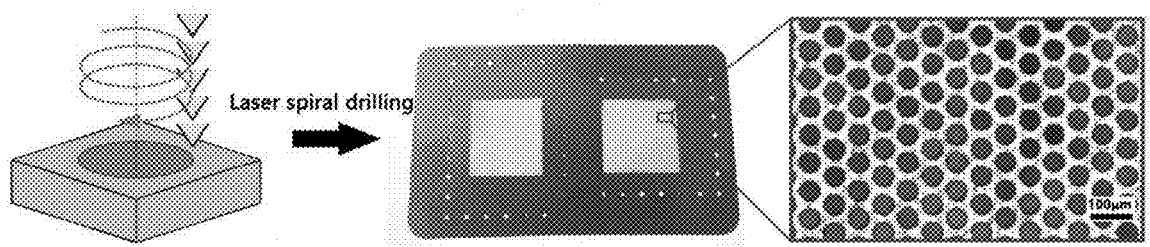
FIG. 2A is a schematic diagram showing a preparation process of a micro through-hole metal-based mold by laser subtractive technology.
Figure 2B:
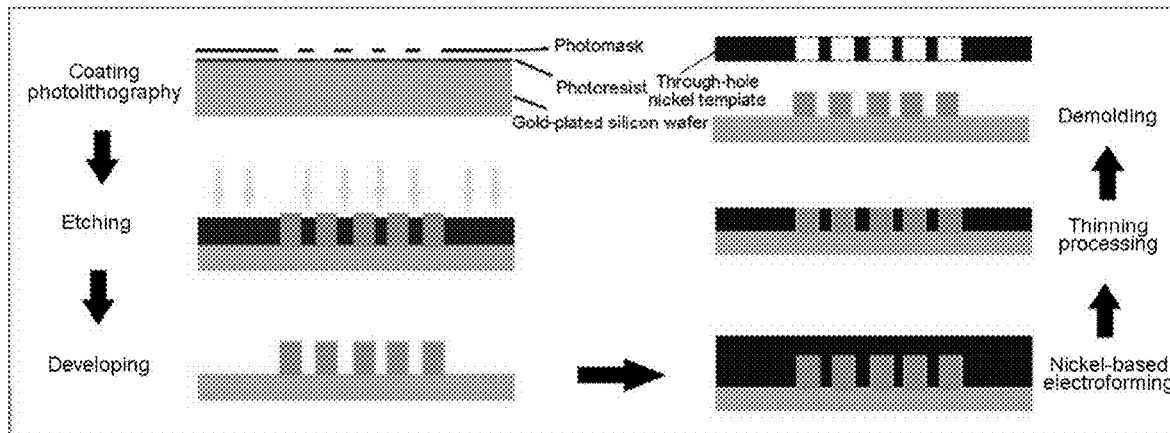
FIG. 2B is a schematic diagram showing a preparation process of a micro through-hole metal-based mold by electroforming additive technology.
Figure 3A:
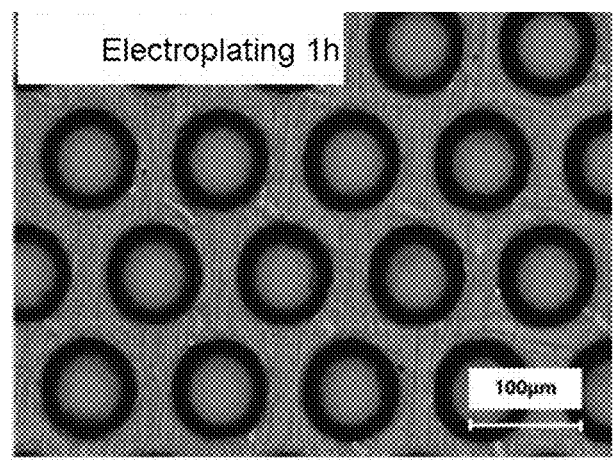
FIG. 3A is a diagram showing auxiliary modification effects of electroplating time of 1 h on the morphology of through-holes.
Figure 3B:
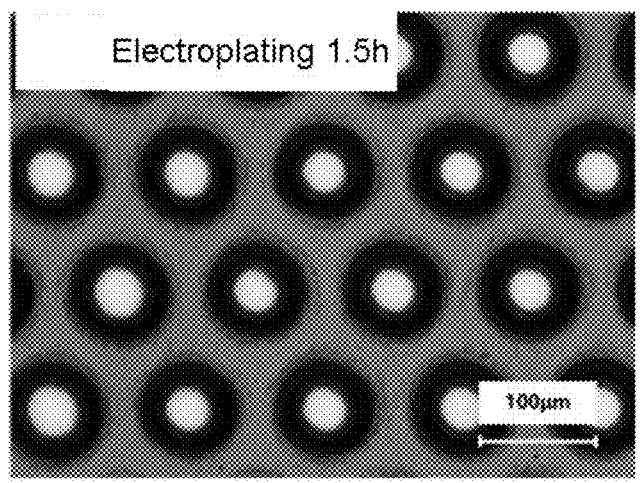
FIG. 3B is a diagram showing auxiliary modification effects of electroplating time of 1.5 h on the morphology of through-holes.
Figure 3C:
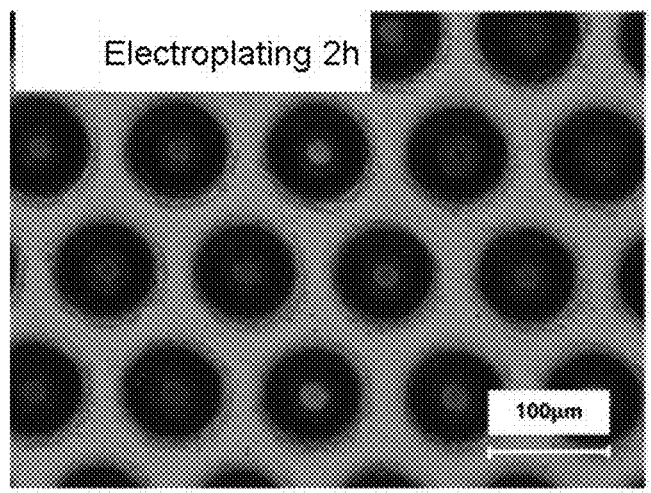
FIG. 3C is a diagram showing auxiliary modification effects of electroplating time of 2 h on the morphology of through-holes.
Figure 3D:
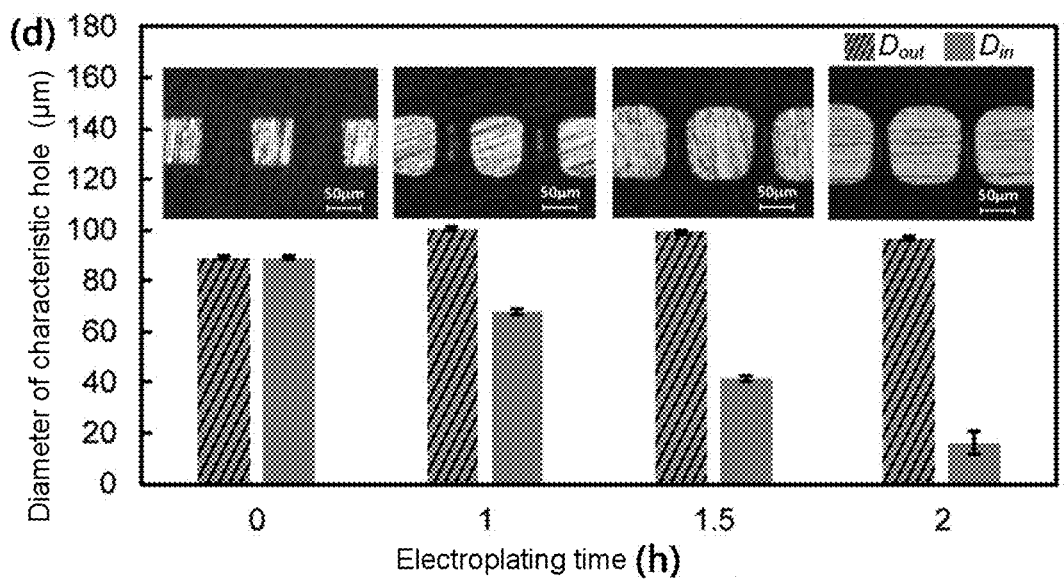
FIG. 3D is a diagram showing auxiliary modification effects of different electroplating time on the morphology of through-holes.

The processing of the high-quality and uniform micro through-hole array on the metal substrate can be achieved in two ways, one is the subtractive processing method of spiral drilling with femtosecond laser, and the other is the additive manufacturing method of silicon-based electroforming. The two manufacturing technology solutions are shown in FIGS. 2A-B. FIG. 2A shows the realization of the large-scale micro through-hole nickel-based basic mold by femtosecond laser. FIG. 2B shows the manufacturing method of combining photolithography and electroplating. The processing of micro-column array is realized by selecting the gold-plated silicon wafer, spin-coated photoresist, exposure, developing and cleaning; and then, the nickel-based micro hole array mold is obtained after the electroplating treatment, thinning and demolding.

The electroplating-assisted modification technology of the array micro through-hole metal mold is the main way to control the micro through-hole cavity, which can indirectly realize the control of the side surface of the bionic adhesive microstructure. For the prepared array micro through-hole nickel-based template, after a series of pre-processing procedures, the electroplating nickel-assisted modification process is carried out to achieve the morphology control of the micro through-hole cavity (see FIGS. 3A-D). The obtained nickel-based mold is subjected to an anti-adhesion treatment. In the anti-adhesion treatment process, the pattern side is laid face up on the container, 10 μL/L (chamber volume) anti-adhesive material FOTS (1H, 1H, 2H, 2H-perfluorodecyltrichlorosilane) is taken, vacuum pumped to 10 mbar, sealed and kept for 30 min. The collection container with residual anti-adhesive agent is taken out, then the mold is baked at 130° C. for 30 min, and cooled naturally.

The prepared through-holes of the nickel-based mold with micro through-hole array are cylindrical holes, the maximum hole diameter is 80 μm, the thickness of the nickel-based mold is 20 μm, and the hole density is greater than 10,000/cm². The nickel-based mold with micro through-hole array is subjected to an anti-adhesion treatment, and the anti-adhesion treatment includes oxygen plasma treatment and surface fluorination.

(2) The Nickel-Based Mold is Placed on an Elastic Pad in a Magnetic Mold Closing System The nickel-based mold obtained in the previous step is placed on an elastic pad in a magnetic mold closing system. The magnet body in the magnetic mold closing system is a rubidium iron boron permanent magnet, with an electroplated layer on the outer surface, an upper surface roughness Ra of less than or equal to 0.05 μm, and a surface finish of greater than level 10. The elastic pad is a polyurethane (PU) elastic pad with an elastic modulus of 1 MPa and a thickness of 5 mm. In order not to affect the demolding, the surface of the PU elastic pad is modified with an anti-adhesion layer. The specific steps are as follows: firstly, the surface of the elastic pad is treated with oxygen plasma to oxidize the surface of the rigid structure layer to produce a very thin layer of silica-like material; and then the surface of the template reacts with 1H, 1H, 2H, 2H-perfluorodecyltrichlorosilane (FOTS) to grow the anti-adhesion layer with low surface energy.

(3) Process Steps for Imprint Filling and Curing

Dow Corning's 184 silicone rubber prepolymer is coated uniformly on a polyethylene terephthalate (PET) backing with a coating thickness of 600 the side of the backing coated with the prepolymer is placed on the nickel-based mold, and the backing is covered with a polydimethylsiloxane (PDMS) sealing diaphragm to separate the cavity into an upper chamber and a lower chamber. The lower chamber is subjected to a vacuum treatment and the upper chamber is filled with $N_2$ to apply a uniform pressure on the backing layer and achieve a full filling of the hole cavity by the prepolymer. The pressure difference between the two sides of the sealing diaphragm is applied to the backing layer through the sealing diaphragm to provide the driving force for filling the prepolymer. During the imprint filling process, the magnetically induced pressure is 0.3 MPa. After the filling is completed, the prepolymer is cured by a thermal curing module, the curing temperature is 100° C., and the curing time is 10 min.

(4) Demolding Process After Curing

After the curing is completed, the pressure is released and demolding is carried out. The force is applied from one side of the backing layer to tear off the backing layer uniformly and slowly to obtain the bionic adhesive structure with mushroom-shaped microstructure tip face.

In the manufacturing process of the bionic adhesive structure involved in the embodiment, the side surface morphology of the bionic adhesive microstructure depends on the configuration of the through-hole cavity of the metal mold, while the tip surface morphology of the mushroom-shaped microstructure depends on the deformation control of the elastic pad induced by the magnetic pressure. The deformation of the elastic pad with a specific modulus can be induced and controlled by the pressure on the elastic pad.

Figure 4A:
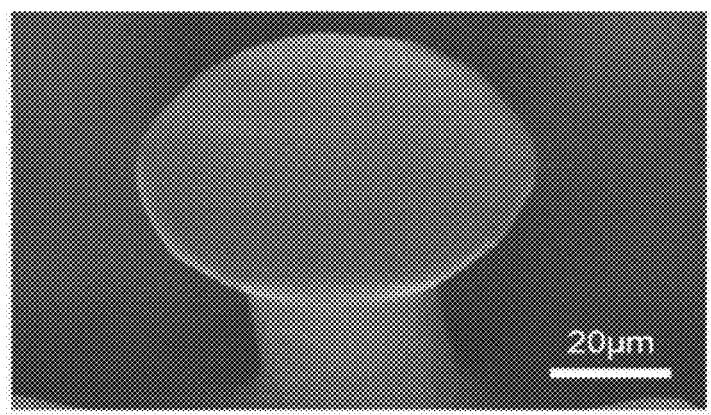
FIG. 4A is a diagram showing effects of induced pressure of 0.3 MPa at the interface on the morphology of the tip surface of mushroom-shaped microstructure.
Figure 4B:
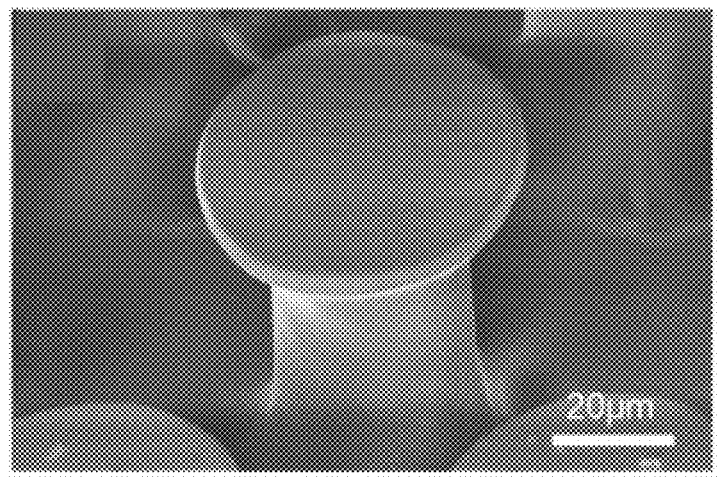
FIG. 4B is a diagram showing effects of induced pressure of 0.5 MPa at the interface on the morphology of the tip surface of mushroom-shaped microstructure.
Figure 4C:
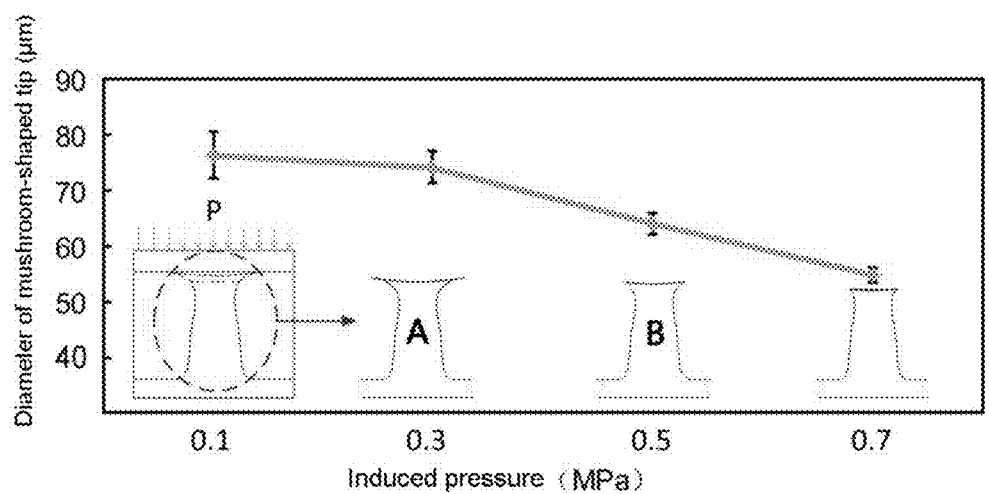
FIG. 4C is a diagram showing effects of different induced pressures at the interface on the morphology of the tip surface of mushroom-shaped microstructure.

FIGS. 4A-C shows that for a PU elastic pad, different magnetic induced pressure has a significant effect on the tip face morphology. It is found that the mushroom-shaped microstructures can be effectively obtained under the pressure in the range of 0.1-0.5 MPa, while the formation of mushroom-shaped expended tip is often inhibited when the pressure is outside the range. Moreover, the induced pressure can also regulate the degree of tip face depression, and the tip face depression of bionic microstructure will bring the multi-mechanism synergy effect of adhesion, such as the synergy of negative pressure adsorption and Van der Waals' force dry adhesion, so as to realize the diversity and robustness of interface adhesion functions.

Embodiment 2

(1) Preparation of Nickel-Based Mold with Micro Through-Hole Array, and the Specific Steps are the Same as that in Embodiment 1

The prepared through-holes of the nickel-based mold with micro through-hole array are trumpet-shaped holes, the maximum hole diameter is 50 µm, the thickness of the nickel-based mold is 100 µm, and the hole density is greater than 10,000/cm$^2$. The nickel-based mold with micro through-hole array is subjected to an anti-adhesion treatment, and the anti-adhesion treatment includes oxygen plasma treatment and surface fluorination.

(2) The Nickel-Based Mold is Placed on an Elastic Pad in a Magnetic Mold Closing System The nickel-based mold obtained in the previous step is placed on an elastic pad in a magnetic mold closing system. The magnet body in the magnetic mold closing system is a rubidium iron boron permanent magnet, with an electroplated layer on the outer surface, an upper surface roughness Ra of less than or equal to 0.05 µm, and a surface finish of greater than level 10. The elastic pad is a PU elastic pad with an elastic modulus of 10 MPa and a thickness of 5 mm.

(3) Process Steps for Imprint Filling and Curing

The prepolymer in this embodiment is thermoplastic polypropylene (PP). PP film with a thickness of 200 µm is used as a backing, and the PP is uniformly coated on the PP film with a coating thickness of 600 µm. The side of the backing coated with the prepolymer is placed on the nickel-based mold, and the backing is covered with a PU sealing diaphragm to separate the cavity into an upper chamber and a lower chamber. The lower chamber is subjected to a vacuum treatment and the upper chamber is filled with N$_2$ to apply a uniform pressure on the backing layer and achieve a full filling of the hole cavity by the prepolymer. The pressure difference between the two sides of the sealing diaphragm is applied to the backing layer through the sealing diaphragm to provide the driving force for filling the prepolymer. During the imprint filling process, the magnetically induced pressure is 0.1 MPa. After the sealing diaphragm is pressurized, the PP is heated to 200° C. for softening, and the mold is filled under pressure. After the filling is completed, the prepolymer is cooled to room temperature for curing.

(4) Demolding Process after Curing

After the curing is completed, the pressure is released and demolding is carried out. The force is applied from one side of the backing layer to tear off the backing layer uniformly and slowly to obtain the bionic adhesive structure.

Embodiment 3

(1) Preparation of Nickel-Based Mold with Micro Through-Hole Array, and the Specific Steps are the Same as that in Embodiment 1

The prepared through-holes of the nickel-based mold with micro through-hole array are wedge-shaped holes, the maximum hole diameter is 90 µm, the thickness of the nickel-based mold is 300 µm, and the hole density is greater than 10,000/cm$^2$. The nickel-based mold with micro through-hole array is subjected to an anti-adhesion treatment, and the anti-adhesion treatment includes oxygen plasma treatment and surface fluorination.

(2) The Nickel-Based Mold is Placed on an Elastic Pad in a Magnetic Mold Closing System The nickel-based mold obtained in the previous step is placed on an elastic pad in a magnetic mold closing system. The magnet body in the magnetic mold closing system is an electromagnet. The elastic pad is a PU elastic pad with an elastic modulus of 5 MPa and a thickness of 5 mm.

(3) Process Steps for Imprint Filling and Curing

In this embodiment, thermoplastic polyurethane (TPU) particles and a dimethylformamide solution are mixed according to a mass ratio of 1:4 and placed on a constant temperature heating magnetic stirrer, fully stirred at a temperature of 60° C.-80° C. until the TPU particles are completely dissolved in the dimethylformamide solution. After being cooled, a polyurethane transfer medium glue solution is obtained as a prepolymer.

The prepared prepolymer is uniformly coated on a PET backing with a coating thickness of 500 µm by a rubber coating machine. The side of the backing coated with the prepolymer is placed on the nickel-based mold, and the backing is covered with a PU sealing diaphragm to separate the cavity into an upper chamber and a lower chamber. The lower chamber is subjected to a vacuum treatment and the upper chamber is filled with N$_2$ to apply a uniform pressure on the backing layer and achieve a full filling of the hole cavity by the prepolymer. The pressure difference between the two sides of the sealing diaphragm is applied to the backing layer through the sealing diaphragm to provide the driving force for filling the prepolymer. During the imprint filling process, the magnetically induced pressure is 0.5 MPa. For the TPU prepolymer in this embodiment, the pressure applied by the sealing diaphragm is able to ensure that the prepolymer fully fills the cavity. After the filling is completed, the prepolymer is heated to 100° C. and cured after 0.5 h.

(4) Demolding Process After Curing

After the curing is completed, the pressure is released and demolding is carried out. The force is applied from one side of the backing layer to tear off the backing layer uniformly and slowly to obtain the bionic adhesive structure.

Embodiment 4

(1) Preparation of Nickel-Based Mold with Micro Through-Hole Array, and the Specific Steps are the Same as that in Embodiment 1

The prepared through-holes of the nickel-based mold with micro through-hole array are cylindrical holes, the maximum hole diameter is 60 μm, the thickness of the nickel-based mold is 500 μm, and the hole density is greater than 10,000/cm². The nickel-based mold with micro through-hole array is subjected to an anti-adhesion treatment, and the anti-adhesion treatment includes oxygen plasma treatment and surface fluorination.

(2) The Nickel-Based Mold is Placed on an Elastic Pad in a Magnetic Mold Closing System The nickel-based mold obtained in the previous step is placed on an elastic pad in a magnetic mold closing system. The magnet body in the magnetic mold closing system is an electromagnet. The elastic pad is a PU elastic pad with an elastic modulus of 6 MPa and a thickness of 5 mm.

(3) Process Steps for Imprint Filling and Curing

UV-curable polymer urethane acrylate (PUA) is used as a prepolymer, stirred and mixed uniformly according to a certain ratio (SC2565 (oligomer): M220:M2101=1:0.06: 0.15, the additive amount of iGM1173 photoinitiator is 4 wt %) to remove bubbles. The prepared PUA glue solution is uniformly coated on a PET backing with a coating thickness of 400 μm by a rubber coating machine. The side of the backing coated with the prepolymer is placed on the nickel-based mold, and the backing is covered with a PDMS sealing diaphragm to separate the cavity into an upper chamber and a lower chamber. The lower chamber is subjected to a vacuum treatment and the upper chamber is filled with $N_2$ to apply a uniform pressure on the backing layer and apply a full filling of the hole cavity by the prepolymer. The pressure difference between the two sides of the sealing diaphragm is applied to the backing layer through the sealing diaphragm to provide the driving force for filling the prepolymer. During the imprint filling process, the magnetically induced pressure is 0.4 MPa. After the filling is completed, a UV curing is performed with a curing light source power of 0.5 W/cm², and the curing is completed after 60 s of lighting.

(4) Demolding Process After Curing

Figure 5:
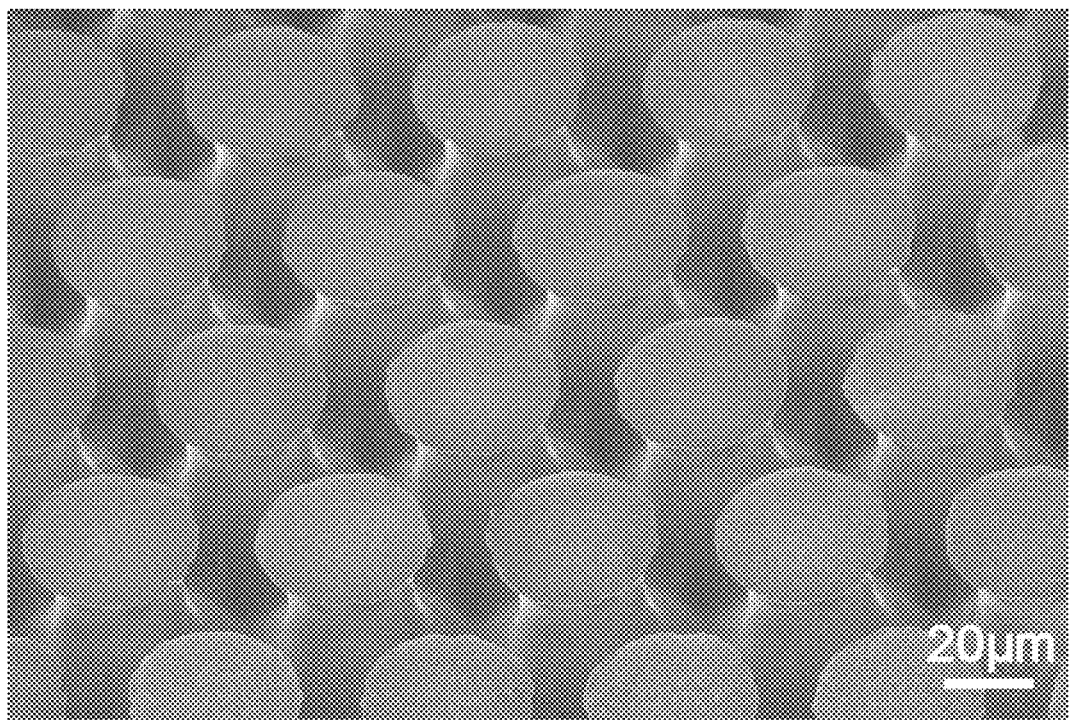
FIG. 5 is a diagram showing the morphology of a polyurethane acrylate (PUA) bionic adhesive material prepared by UV curing.

After the curing is completed, the pressure is released and demolding is carried out. The force is applied from one side of the backing layer to tear off the backing layer uniformly and slowly to obtain the bionic adhesive structure. The morphology of the bionic adhesive structure is shown in FIG. 5.

The above-mentioned embodiments only describe the preferred modes of the present invention and are not intended to limit the scope of the present invention. Without departing from the design spirit of the present invention, various modifications and improvements made by those of ordinary skill in the art to the technical solution of the present invention shall fall within the protective scope specified by the claims of the present invention.

What is claimed is:

1. A flat-pressing manufacturing method of a bionic adhesive structure based on a micro through-hole nickel-based mold, comprising the following steps:
   (1) preparing a nickel-based mold with a micro through-hole array;
   (2) placing the nickel-based mold on an elastic pad in a magnetic mold closing system;
   (3) coating a prepolymer uniformly on a backing, and placing a side of the backing coated with the prepolymer on the nickel-based mold, covering a sealing diaphragm on the backing to separate a cavity into an upper chamber and a lower chamber, and performing a vacuum treatment on the lower chamber and an inflation treatment on the upper chamber to apply a uniform pressure on the backing and achieve a full filling of cavities of through-holes by the prepolymer; and
   (4) after the full filling is completed, curing and demolding to obtain the bionic adhesive structure.

2. The flat-pressing manufacturing method of the bionic adhesive structure based on the micro through-hole nickel-based mold of claim 1, wherein
   the through-holes of the nickel-based mold in step (1) are cylindrical holes or special-shaped holes, wherein the special-shaped holes are trumpet-shaped holes or wedge-shaped holes,
   a maximum hole diameter of the through-holes is not greater than 100 μm,
   a thickness of the nickel-based mold is 20-500 μm, and
   a hole density of the nickel-based mold is greater than 10,000/cm².

3. The flat-pressing manufacturing method of the bionic adhesive structure based on the micro through-hole nickel-based mold of claim 1, wherein the nickel-based mold has been subjected to an anti-adhesion treatment.

4. The flat-pressing manufacturing method of the bionic adhesive structure based on the micro through-hole nickel-based mold of claim 1, wherein the magnetic mold closing system in step (2) comprises a magnet and the elastic pad.

5. The flat-pressing manufacturing method of the bionic adhesive structure based on the micro through-hole nickel-based mold of claim 4, wherein a surface roughness Ra of the magnet is less than or equal to 0.05 μm, and a surface finish of the magnet is greater than level 10; and an elastic modulus of the elastic pad is 1 MPa-10 MPa.

6. The flat-pressing manufacturing method of the bionic adhesive structure based on the micro through-hole nickel-based mold of claim 1, wherein the magnet is a permanent magnet or an electromagnet, and a substrate of the elastic pad is anti-adhesive or a surface of the substrate has been subjected to an anti-adhesion treatment.

7. The flat-pressing manufacturing method of the bionic adhesive structure based on the micro through-hole nickel-based mold of claim 1, wherein the prepolymer in a liquid state in step (3) is a thermosetting prepolymer or an ultraviolet-curable prepolymer.

8. The flat-pressing manufacturing method of the bionic adhesive structure based on the micro through-hole nickel-based mold of claim 1, wherein a coating thickness of the prepolymer in step (3) is 400-600 μm, and a magnetically induced pressure of the magnetic mold closing system during the full filling is 0.1-0.5 MPa.

9. The flat-pressing manufacturing method of the bionic adhesive structure based on the micro through-hole nickel-based mold of claim 1, wherein the demolding in step (4) is to apply force from one side of the backing to tear off the backing uniformly and slowly.

10. The flat-pressing manufacturing method of the bionic adhesive structure based on the micro through-hole nickel-based mold of claim 1, wherein the bionic adhesive structure in step (4) is an elastomer microstructure array with a feature of tip expansion.

* * * * *